May 22, 1973            J. B. PRICE ET AL            3,734,770
NITROGEN NUCLEATION PROCESS FOR THE CHEMICAL VAPOR
DEPOSITION OF POLYCRYSTALLINE SILICON FROM $SiCl_4$
Filed Dec. 14, 1970
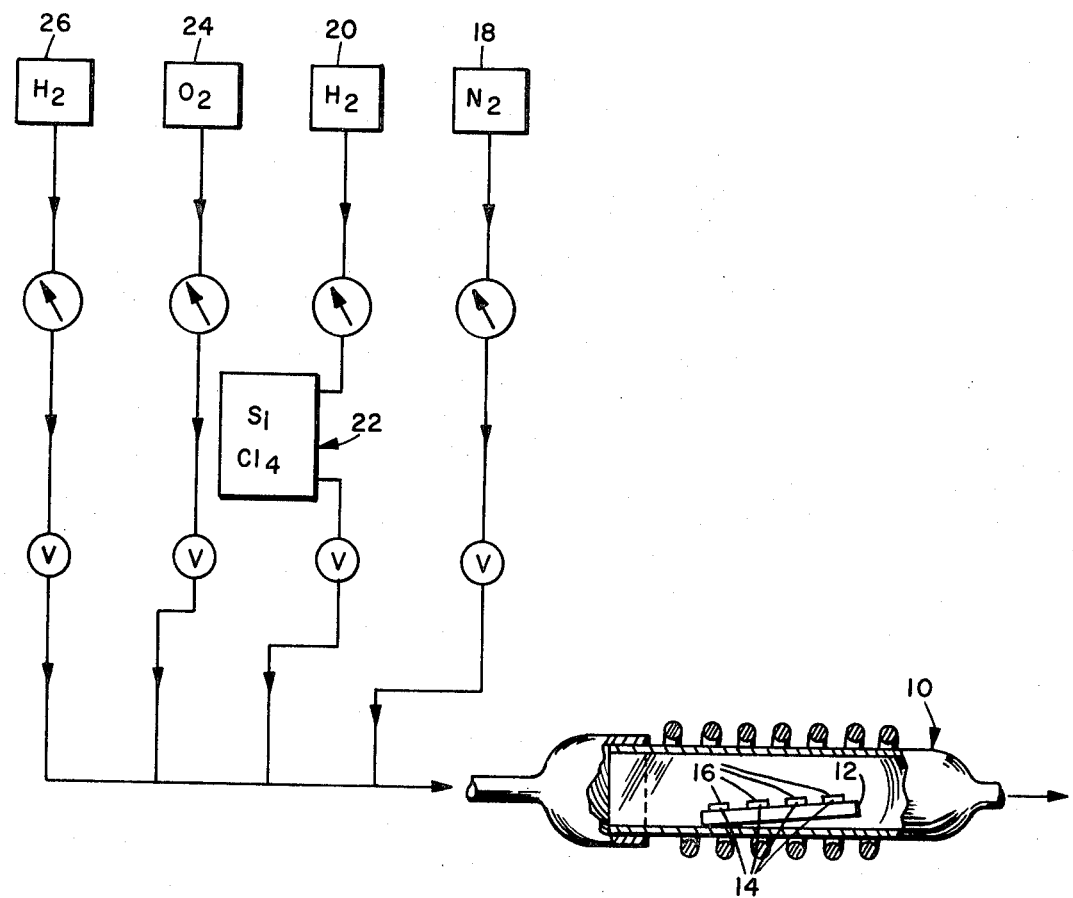
INVENTOR.
James B. Price
William C. Roman
BY
ATTY'S.

United States Patent Office 3,734,770
Patented May 22, 1973

3,734,770
NITROGEN NUCLEATION PROCESS FOR THE CHEMICAL VAPOR DEPOSITION OF POLYCRYSTALLINE SILICON FROM SiCl$_4$
James B. Price, Phoenix, and William C. Roman, Tempe, Ariz., assignors to Motorola, Inc., Franklin Park, Ill.
Filed Dec. 14, 1970, Ser. No. 97,811
Int. Cl. B44d 1/18
U.S. Cl. 117—217    6 Claims

ABSTRACT OF THE DISCLOSURE

A process is disclosed herein for the use of nitrogen in a nucleation process for the chemical vapor deposition of polycrystalline silicon from SiCl$_4$. After establishing the desired furnace temperature at a single temperature lying within the range of 900° C. to 1200° C., the system is purged with nitrogen and hydrogen. After the system has been purged, the nitrogen flow is stopped and the SiCl$_4$ flow is started simultaneously. The overlap of nitrogen and SiCl$_4$ within the system causes nucleation from which a very fine grain layer of polycrystalline silicon is grown.

BACKGROUND OF THE INVENTION

The prior art shows the use of silane SiH$_4$ as a nucleation initiating material. A thin layer of polycrystalline silicon, less than a micron, is grown at a temperature lying between the limits of 900° C. and 1000° C. Then the system is purged with hydrogen before bringing in the substantial flow of SiCl$_4$ at a higher temperature.

However, this system has several disadvantages including the fact that it is more complex since it uses both silane SiH$_4$ and silicon tetrachloride SiCl$_4$ as two sources of silicon. The silane, SiH$_4$, initiates excessive polycrystalline silicon growth on the reverse side of the silicon wafer than that growth on the reverse side resulting from the use of silicon tetrachloride. Additionally, the silane nucleates more polycrystalline silicon growth on both the furnace tube and the wafer carrier employed in the process and thus shortens the lifetime of both components. This growth on the furnace tube also makes the final temperature setting of the process more difficult when using the two temperature and two gas process because the silane starts polycrystalline silicon growth on the wall of the furnace tube and optical sightings through this wall with a pyrometer are used to set the second temperature used in the process.

A second process for the forming of a polycrystalline layer employs trichlorosilane, SiHCl$_3$, as the source gas. A temperature is used lying between the range of 900° C. to 1200° C. Although this is a single gas, single source system, its use results in at least the following two disadvantages. Trichlorosilane grows a considerably greater amount of silicon on the furnace wall and on the reverse side of the wafer as compared to the silicon tetrachloride as proposed in the present invention. Additionally, the use of trichlorosilane grows larger grains of polycrystalline silicon than the silicon tetrachloride with nitrogen nucleation as proposed in the present invention.

SUMMARY OF THE INVENTION

The present invention relates to the chemical vapor deposition of polycrystalline silicon on a dielectric layer, and more particularly, it relates to such a deposition using nitrogen as a nucleating material, using silicon tetrachloride as the source gas and, operating within the temperature range of 900° C. to 1200° C.

It is an object of the present invention to provide an improved process for forming fine grain layers of polycrystalline silicon wherein the grain size is less than three microns.

It is another object of the present invention to provide an improved process for forming fine grain layers of polycrystalline silicon using silicon tetrachloride as the source gas and nitrogen gas as the nucleating means for polycrystalline silicon growth and using a single temperature setting at which the entire process is performed.

A still further object of the present invention is to use nitrogen gas as a nucleation means in the chemical vapor deposition growth of polycrystalline silicon at a single temperature selected from a temperature range of 900° C. to 1200° C. with a single gas as the source of silicon.

Another object of the present invention is the promoting of polycrystalline silicon growth on a dielectric material using nitrogen as a nucleating means.

A further object of the present invention is to provide a process for the growth of polycrystalline silicon on an upper surface of a semiconductor wafer within a vapor deposition furnace such that only a minimum amount of silicon is grown on the furnace walls and a minimum amount of silicon is grown on the reverse surface of the wafer.

These and other objects and features of this invention will become fully apparent in the following description of the process as performed by the apparatus shown in the figure.

BRIEF DESCRIPTION OF THE INVENTION

The present invention discloses a process for the nucleating of polycrystalline silicon growth on a dielectric layer using nitrogen gas as the nucleating agent, hydrogen as a carrier gas, and silicon tetrachloride as the source of silicon. The chemical vapor deposition of the silicon is performed in a standard deposition furnace at a single temperature selected from the range of 900° C. to 1200° C. depending on the desired rate of polycrystalline silicon growth.

While the preferred operating range lies between 1100° C. and 1150° C. for a high rate of growth of three to four microns of polycrystalline silicon per minute, fine grain polycrystalline silicon is grown within the entire temperature range with slower growth rates at the lower temperatures and the higher growth rates at the higher temperatures.

DETAILED DESCRIPTION OF THE INVENTION

A standard vapor deposition furnace 10 contains a wafer carrier 12 holding a plurality of semiconductor wafers 14 having upper exposed surfaces 16 upon which it is desired to form polycrystalline silicon layers. The system comprises a plurality of gas reservoirs including a nitrogen source 17, a hydrogen source 20 which passes through a silicon tetrachloride trap 22, an oxygen source 24 and a second hydrogen source 26 which goes directly to the furnace 10. Each gas source is controlled by a valve for shutting off or reducing gas flow as desired. Additionally, a flow meter is conveniently placed in each gas line for determining the rate of gas flow.

A first example of operating the present invention comprises placing the semiconductor wafer in a furnace and starting the hydrogen from the source 26 flowing through the furnace at the rate of 1000 cubic centimeters per second and the nitrogen from the source 18 flowing at the rate of 333 cubic centimeters per second. The percentage of nitrogen to hydrogen flowing in the system at this time can vary from 30% to 90% nitrogen and the process operates satisfactorily. Next the furnace temperature is brought to a value of 1145° C. and the system is left to equalize at this temperature. A time of 5 minutes has been found sufficient for this purpose. Obviously, the furnace temperature can be fixed before the gas flow begins but this obvious reordering of the process steps and others will be apparent to one skilled in the art and is not to be a limitation on the invention.

After the system has equalized, the nitrogen gas is turned off and simultaneously the silicon tetrachloride is brought into the system. This amount of silicon tetrachloride is measured by the quantity of hydrogen from the source 20 flowing through the trap 22. This quantity is 165 cubic centimeters per second. This procedure is maintained until the desired amount of polycrystalline silicon is formed on the exposed surfaces 16 of the wafers 14.

A lowering of the flow rate from the hydrogen source 20 reduces the growth rate of polycrystalline silicon on the surfaces 16.

A second example of the process operation includes the sequential growth of a silicon dioxide layer on a semiconductor wafer followed by the growth of a polycrystalline silicon layer. The furnace is heated to a temperature of 1120° C. with a flow of hydrogen only. When it is desired to form the silicon dioxide layer, the hydrogen flow is established at 700 cubic centimeters per second and an oxygen flow, from the source 24, of 4 cubic centimeters per second is established. Next a flow of hydrogen from the source 20 of 2. cc./min. adds silicon tetrachloride to the system for the growth of 1–10K angstroms of silicon dioxide on the wafers.

With the desired silicon dioxide growth on the wafers 14, the oxygen and silicon tetrachloride in hydrogen are turned off with the silicon tetrachloride being turned off first. The hydrogen carrier gas from the source 26 is reduced from 700 cc./sec. to 100 cc./sec. and the nitrogen flow from the source 18 is established at 700 cc./sec. This mixture is run for three minutes and then a flow of 8 cc./sec. of hydrogen through the trap 22 adds silicon tetrachloride to the system.

Upon the introduction of silicon tetrachloride into the system, the flow of hydrogen from the source 26 is increased monotonically from 100 cc./sec. to 700 cc./sec. over a period of two minutes. At the end of two minutes the nitrogen flow is stopped as the nucleation process is complete. At this same time the flow of hydrogen from the source 20 through the trap 22 can be increased to give the desired growth rate for the bulk growth of polycrystalline silicon.

The present invention provides the growth of polycrystalline silicon from a single silicon source of silicon tetrachloride which is a less expensive source of silicon when compared with the expense of using SiH$_4$. A minimum of silicon is formed on the furnace walls and the total process time is reduced as an added cost savings. The present system is compatible with the growth of silicon dioxide on a semiconductor body prior to growth of polycrystalline silicon. Additionally, the use of the present system gives a composite structure comprising a lower semiconductor body, and intermediate dielectric layer such as silicon dioxide and, an upper layer of polycrystalline silicon. There is a reduced thermal stress between layers and less polycrystalline silicon undergrgowth on dielectric isolated structures.

In the first example, the flow of nitrogen gas is stopped upon the introduction of the silicon tetrachloride since the presence of nitrogen after the nucleation process is completed, causes unsatisfactory silicon growth. In the second example the flow of silicon tetrachloride is kept low as well as increasing the flow of carrier hydrogen gas as a means for keeping the percentage of nitrogen in the furnace low. Both procedures are calculated at maintaining within the furnace that small amount of nitrogen gas needed for nucleation and once nucleation begins the nitrogen is swept out.

Additionally, it has been found that the use of a small amount of oxygen in the furnace during the polycrystalline silicon growth gives an unacceptable coarse grain growth.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method for the compatible growth of a silicon dioxide layer and the use of nitrogen in a nucleation process for the chemical vapor deposition of polycrystalline silicon from silicon tetrachloride on the silicon dioxide layer comprising the steps of:
   providing a silicon semiconductor member upon which a silicon dioxide layer and a polycrystalline silicon layer are to be formed;
   heating said member to a temperature lying between the ranges of 900° C. to 1200° C.;
   adding a mixture of hydrogen and oxygen flowing across said member;
   adding a flow of silicon tetrachloride across said member until the desired thickness of silicon dioxide is formed on said member;
   stopping the flow of oyxgen and silicon tetrachloride;
   adding a flow of nitrogen across said member;
   adding a flow of silicon tetrachloride across said member and simultaneously increasing the flow of hydrogen;
   stopping the flow of nitrogen across said member after a thin layer of polycrystalline silicon has been deposited on said member; and
   continuing the flow of hydrogen and silicon tetrachloride until a predetermined layer of polycrystalline silicon has been deposited on said member.

2. A method for the use of nitrogen in a nucleation process for the chemical vapor deposition of polycrystalline silicon from silicon tetrachloride comprising the steps of:
   providing a member upon which polycrystalline silicon is to be formed;
   heating said member to a temperautre at which polycrystalline silicon forms on said member;
   adding a mixture of hydrogen and nitrogen to flow across said member, the percentage of nitrogen to hydrogen being between the range of 30% to 90%;
   simultaneosuly adding silicon tetrachloride to flow across said member and stopping the flow of nitrogen across said member; and
   continuing the flow of silicon tetrachloride and hydrogen until a predetermined thickness of polycrystalline silicon is deposited on the member.

3. The method as recited in claim 2, wherein said flow of hydrogen is increased upon the addition of said silicon tetrachloride.

4. The method as recited in claim 2, wherein said member is a semiconductor substrate.

5. The method as recited in claim 2, wherein said member is a silicon semiconductor substrate.

6. The method as recited in claim 2, wherein said member is a dielectric material.

References Cited

UNITED STATES PATENTS

| | | | |
|---|---|---|---|
| 3,112,997 | 12/1963 | Benzing et al. | 23—223.5 |
| 3,331,716 | 7/1967 | Bloem et al. | 148—175 |
| 3,445,300 | 5/1969 | Sirtl | 148—175 |
| 3,461,003 | 8/1969 | Jackson, Jr. | 148—175 |

CAMERON K. WEIFFENBACH, Primary Examiner

U.S. Cl. X.R.

117—106 R, 106 A, 107.2 R, 215, 227